United States Patent [19]
Hauck

[11] Patent Number: 5,962,036
[45] Date of Patent: Oct. 5, 1999

[54] TWIN SCREW EXTRUDER WITH HIGH-SPEED BEARING SUPPORT

[75] Inventor: Bobbie W. Hauck, Sabetha, Kans.

[73] Assignee: Wenger Manufacturing, Inc., Sabetha, Kans.

[21] Appl. No.: 09/004,530

[22] Filed: Jan. 8, 1998

[51] Int. Cl.⁶ .................................................. B29C 47/58
[52] U.S. Cl. ........................... 425/190; 366/85; 425/204; 425/205
[58] Field of Search .................................. 425/190, 204, 425/205, 207; 366/84, 85

[56] References Cited

U.S. PATENT DOCUMENTS

| | | | |
|---|---|---|---|
| 3,947,200 | 3/1976 | Fischer | 425/204 |
| 5,019,310 | 5/1991 | Kobayashi | 425/204 |
| 5,055,027 | 10/1991 | Sato | 425/208 |

Primary Examiner—Harold Pyon
Assistant Examiner—Joseph Leyson
Attorney, Agent, or Firm—Hovey, Williams, Timmons & Collins

[57] ABSTRACT

A twin screw extruder (10) including an elongated barrel (12), a pair of elongated rotatable screws (14) and (16) positioned within the barrel (12) for moving material therethrough, and a high-speed bearing support assembly (18) for supporting the screws (14, 16) against misalignment and wear. The bearing support assembly (18) includes a pair of rotors (42, 44) each operably coupled with corresponding extruder screws (14, 16) for rotation therewith and a stator member (46) coupled with the extruder barrel (12) for receiving the rotors (42, 44). The stator (46) includes a plurality of injection ports (62) for directing an edible lubricant such as liquid fat into the bearing assembly (18) during operation of extruder (10).

5 Claims, 1 Drawing Sheet

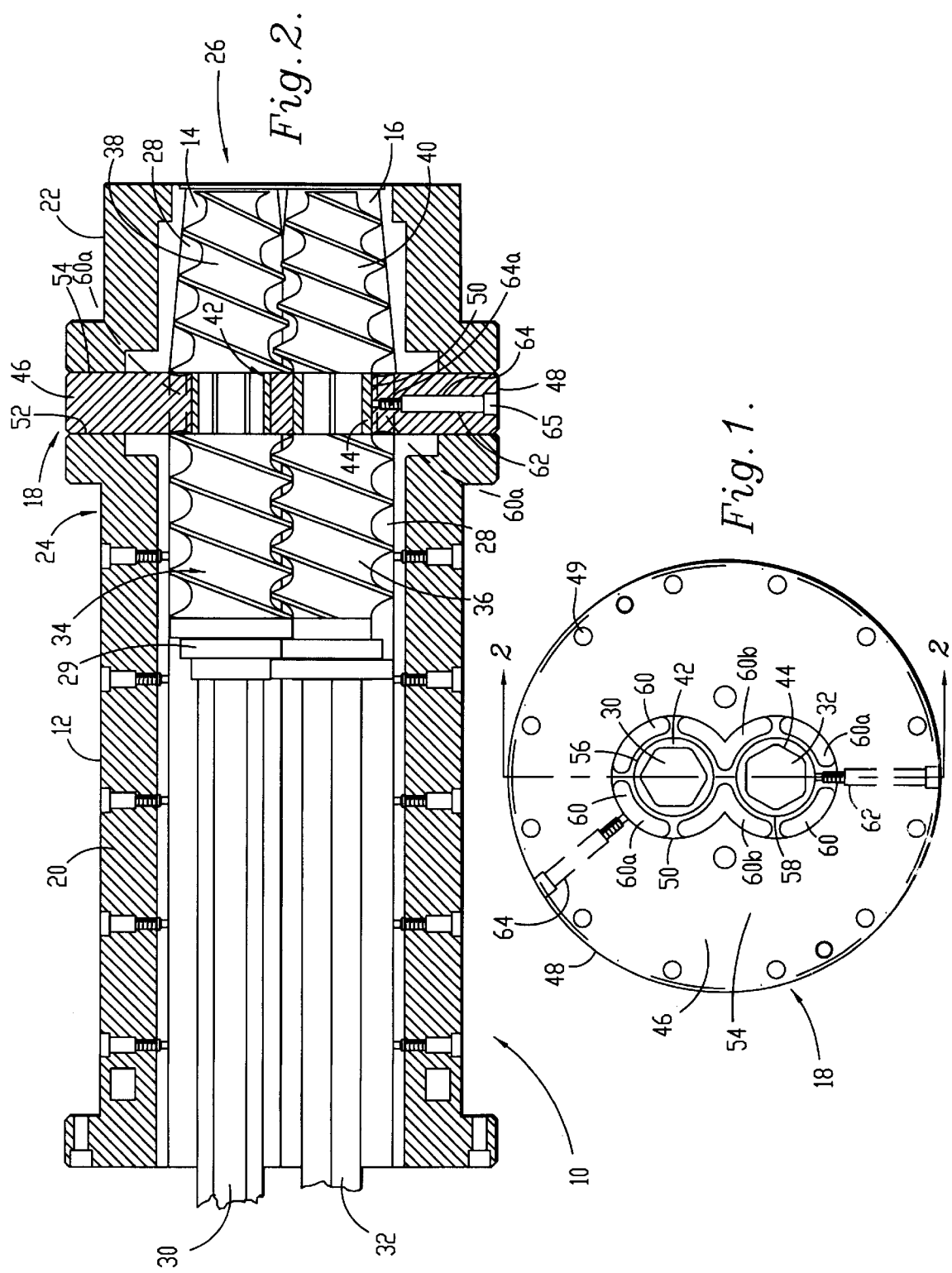

TWIN SCREW EXTRUDER WITH HIGH-SPEED BEARING SUPPORT

BACKGROUND OF THE INVENTION

1. Field of the Invention

The present invention relates to twin screw extruders, and more particularly to an improved twin screw food extruder with bearing assemblies providing improved screw support to minimize the tendency of the extruder screws to come into wearing contact with each other and/or to the surrounding barrel walls during rotation. In addition, the bearing assemblies of the invention are preferably provided with means for the injection of an edible lubricant such as a liquid fat, so that the assemblies can be lubricated during use with liquids which enhance the final properties of the extrudate.

2. Description of the Prior Art

Extruders are industrial devices that are used to transport and process a wide variety of materials such as thermoplastic resins and plant-derived substances. Extruders generally include an elongated tubular barrel having a material inlet and a material outlet and one or more rotatable, flighted extrusion screws positioned within the barrel for transporting material therethrough.

One class of extruders includes the "twin screw" extruder, which has a pair of juxtaposed, elongated, flighted screws within a complemental barrel. An example of a twin screw extruder is described in U.S. Pat. No. 4,875,847, commonly owned with the present invention and hereby incorporated by reference.

One of the chief advantages of twin screw extruders, as compared with mono-screw extruders, is that twin screw extruders more efficiently transport material through the extruder barrel. This is because mono-screw extruders introduce fore and aft movement of the material as it progresses along the length of the barrel. Twin screw extruders avoid such fore and aft movement by the use of two intermeshed screws that operate in the manner of a positive displacement pump.

Despite the advantages inherent in the design of twin screw extruders, some prior art twin screw devices suffer from operational problems that significantly increase their cost and therefore limit their utility. Particularly, twin screw extruders can exhibit a marked tendency to prematurely wear out machine components. This is because the screws on prior twin screw extruders have a bearing support only at their rearmost or product inlet ends provided by their drive shafts, but are unsupported at their forward or material outlet ends.

This cantilever-type support is problematic because, when in use, twin screw extruders are subject to a build-up of pressures near the region where the screws are intermeshed. This pressure tends to separate and push the screws into wearing contact with the adjacent barrel walls, thus rapidly wearing both the screws and the barrel components.

In addition, conventional twin screw extruders with cantilever-type screw support can suffer wear problems because of inordinate screw-to-screw contact during extruder operation. This type of wear is especially acute during high rotational speed operation of the extruder screws.

The above-referenced '847 patent discloses a significantly improved extruder having conical nose screw sections adjacent the die ends of the screws which provide a bearing-type support during use of the extruder, thus reducing wear. The present invention provides a new improved twin screw extruder that even more effectively eliminates wear problems commonly encountered with conventional twin screw extruders.

SUMMARY OF THE INVENTION

The extruder of the present invention broadly includes an elongated barrel presenting a material inlet and a material outlet, a pair of elongated, rotatable flighted screws positioned within the barrel for moving material therethrough, and a bearing assembly interposed between the barrel inlet and outlet and operably supporting the screws for maintaining the radial position of the screws within the barrel.

The bearing assembly broadly includes a rotor or rotating member operably coupled with each of the extruder screws for rotation therewith and a stator or stationary member coupled with the barrel for receiving and supporting the rotor and associated screws during rotation. The rotors preferably comprise a circular bearing operably coupled with each corresponding screw. The circular bearings are preferably journal-type bearings and are coupled with the associated splined drive shaft for the screws.

The stator preferably includes a bearing support member coupled with the barrel for receiving and supporting the circular bearings during use of the extruder. The bearing support member is preferably disk-shaped and is interposed between the material inlet and outlet ends of the extruder between two axially spaced barrel sections. The bearing support member includes an outer circumscribing wall that presents an outside diameter substantially equal to the outside diameter of the extruder barrel and a pair of central adjoining apertures for receiving and supporting the circular bearings.

During use of the extruder, the circular bearings and the portions of the drive shafts to which they are attached rotate within the central apertures of the stator. The bearing support member maintains the radial position of the screws within the barrel and prevents the screws from separating and coming into wearing contact with the barrel walls, and/or into wearing contact with each other.

In preferred forms, the bearing support member may include one or more radially extending fluid passageways extending inwardly towards the central apertures for receiving and directing lubricant towards the rotating circular bearings. This reduces the frictional forces developed between the circular bearings and the bearing support members during rotation of the screws.

BRIEF DESCRIPTION OF THE DRAWING FIGURES

A preferred embodiment of the present invention is described in detail below with reference to the attached drawing figures, wherein:

FIG. 1 is a fragmentary sectional view illustrating the bearing assembly of the invention mounted in the barrel of a twin screw extruder and with certain parts shown in phantom; and FIG. 2 is a sectional view taken along line 2—2 of FIG. 1 which further illustrates the construction of the preferred extruder and barrel assembly.

DETAILED DESCRIPTION OF THE PREFERRED EMBODIMENT

Turning now to the drawing, and particular FIG. 1, an extruder 10 constructed in accordance with a preferred embodiment of the invention is illustrated. The extruder 10 broadly includes an elongated barrel 12, a pair of rotatable screws 14 and 16 positioned within the barrel 12 for moving material therethrough, and a bearing assembly broadly referred to by the numeral 18 operably coupled with the screws 14 and 16 for maintaining the radial position of the screws 14 and 16 within the barrel 12. As described below, the bearing assembly 18 substantially prevents the screws 14 and 16 from undue wearing contact with each other and/or the barrel walls during use of the extruder 10.

In more detail, the barrel 12 is conventional in construction and is described more fully in the above-referenced and incorporated '847 patent. Generally, the barrel 12 includes a series of axially aligned and interconnected barrel sections including at least a tubular barrel inlet section (not shown), a series of intermediate barrel sections such as section 20, and conical outlet section 22. Those skilled in the art will appreciate that a plurality of intermediate barrel sections 20 may be interconnected between the inlet section and the outlet section 22 to form a barrel of any desired length.

Each of the barrel sections 20 and 22 is of tubular design which, when interconnected together, define an elongated barrel having an inlet end, an outlet end 26 adapted to receive an apertured extrusion die (not shown), and interior walls presenting a bore 28 of generally figure eight cross-sectional configuration extending along the length of the barrel 12.

The screws 14 and 16 are also conventional in construction and are described more fully in the '847 patent. The screws 14 and 16 are juxtaposed within the barrel passageway 28, with their flighting intermeshed. This increases the pumping efficiency of the extruder 10. The screws 14 and 16 can be counter-rotating (i.e., rotating in opposite directions relative to each other) or co-rotating (i.e., rotating in the same direction). As described in the '847 patent, the screws 14 and 16 may include a plurality of helical flighting ribs and may include mixing elements 29 between the screw sections for mixing material passing through the extruder 10.

Generally, each screw 14 and 16 includes an elongated rotatable central drive shaft 30 or 32 and a series of axially spaced flighted screw sections rotatably coupled with the drive shaft. As shown, the screw assembly 14 is made up of a series of aligned and interconnected screw sections 34, with an endmost conical, tapered screw section 38. Similarly, screw 16 includes screw sections 36 attached to the drive shaft 32 within the barrel section 20 and a conical endmost screw section 40 within the conical barrel outlet section 22.

The screw sections 34 and 36 and the corresponding conical screw sections 38 and 40 are aligned on their respective drive shafts 30 and 32 for permitting mounting of the bearing assembly 18 to the drive shafts as described in more detail below.

The bearing assembly 18 provides bearing support for the screws 14 and 16 adjacent barrel outlet end 26 for substantially maintaining the radial position of the screws 14 and 16 within the barrel passageway 28 during rotation thereof. This essentially prevents the screws 14 and 16 from separating from one another and contacting the interior wall of the barrel 12, and/or coming into wearing contact with each other, thus reducing wear on both the screws 14 and 16 and the barrel 12.

As best illustrated in FIG. 1, the preferred bearing assembly 18 is situated between the forwardmost screw sections 34, 36 and the conical screw sections 38 and 40. It is to be understood that while this bearing location is preferred, the bearing assembly could be placed at any one of a number of different locations along the length of barrel 12. Broadly speaking, the assembly 18 includes a pair of adjacent rotors 42, 44 respectively mounted on the screw shafts 30, 32, together with a unitary stator 46. The stator 46 is sandwiched between barrel heads 20 and 22 as shown.

Referring specifically to FIG. 1, it will be observed that the stator 46 includes outboard flange wall portion 48 disposed between the proximal surfaces of heads 20 and 22; the portion 48 is provided with mounting bolt holes 49 as shown. The stator 46 also has an inner shoulder 50 of generally figure eight configuration, and opposed rear and front faces 52, 54. The shoulder 50 surrounds a pair of laterally spaced apart, circular bearing openings 56, 58. As illustrated, the stator 46 is also provided with a total of six elongated slots 60 therethrough, namely four relatively short, arcuate outboard slots 60a and a pair of somewhat V-shaped intermediate inboard slots 60b.

The rotors 42, 44 are essentially identical and are respectively secured to the hexagonal drive shafts 30, 32 for rotation therewith. As best seen in FIG. 2, each bearing 42, 44 is disposed within an associated opening 56 or 58 in closely conforming relationship so as to provide the necessary high speed bearing support.

The stator 46 also has a pair of radially extending, circumferentially spaced fluid injection ports 62 allowing introduction of lubricant into the bearing assembly 18. In particular, each port 62 includes an elongated, generally radially extending passageway 64 provided with a threaded inboard end 64a. A lubricant-conveying tube 65 is positioned within each passageway 64 and has a threaded nipple received within the threaded end 64a. One exemplary port is oriented for delivery of lubricant to the juncture between rotor 44 and opening 58, whereas the other is located for delivery into a slot 60a; of course other ports could also be provided with the stator 46. This arrangement allows for the delivery of an edible lubricant such as liquid fat into the assembly 18 during operation.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

I claim:

1. An extruder comprising:

an elongated barrel presenting an inlet end, a spaced outlet end, and an elongated internal bore extending between said inlet and outlet ends;

a pair of elongated, juxtaposed, axially rotatable flighted screws positioned within said bore for moving material therethrough; and a bearing assembly interposed between said barrel inlet and outlet ends and operably coupled with said screws for maintaining the radial position of said screws within said bore, said bearing assembly including a rotor operably coupled with each of said screws for rotation therewith, and a stator operably coupled with said barrel, said stator having structure defining a pair of openings respectively receiving a corresponding one of said rotors to present a rotor/stator bearing interface, and a passageway separate from and spaced from said rotor/stator bearing interface for allowing passage of said material through the bearing assembly.

2. The extruder as set forth in claim 1, said stator further including a fluid passageway extending generally radially inwardly and communicating with one of said openings for directing lubricant towards and into said one opening for lubricating said bearing assembly.

3. The extruder as set forth in claim 1, said flighted screws each including a central rotating drive shaft and proximal screw sections coupled with and axially aligned on said drive shaft, said rotors being secured to said drive shafts.

4. The extruder as set forth in claim 3, said barrel including adjacent axially aligned barrel sections, said stator being interposed between said adjacent barrel sections.

5. The extruder as set forth in claim 4, said stator including a plurality of product-conveying openings therethrough.

\* \* \* \* \*